United States Patent [19]

Murray et al.

[11] 4,120,775

[45] Oct. 17, 1978

[54] PROCESS AND APPARATUS FOR SEPARATING COARSE SAND PARTICLES AND RECOVERING BITUMEN FROM TAR SANDS

[75] Inventors: Robert G. Murray, Palo Alto; Benjamin J. Gikis, Los Altos Hills, both of Calif.

[73] Assignee: Natomas Company, San Francisco, Calif.

[21] Appl. No.: 816,506

[22] Filed: Jul. 18, 1977

[51] Int. Cl.[2] .......................... B03B 5/36; C10G 1/00; C10C 1/18; B01D 11/02

[52] U.S. Cl. ............................... 208/11 E; 196/14.52; 422/281

[58] Field of Search ................ 208/11 LE; 196/14.52; 23/270 R, 267 MS

[56] References Cited

U.S. PATENT DOCUMENTS

| | | | |
|---|---|---|---|
| 2,973,312 | 2/1961 | Logan | 208/11 LE |
| 3,553,099 | 1/1971 | Savage et al. | 208/11 LE |
| 3,875,046 | 4/1975 | Rosenbloom | 208/11 LE |
| 3,984,287 | 10/1976 | Meadus et al. | 208/11 LE |

*Primary Examiner*—Delbert E. Gantz

*Assistant Examiner*—Joan Thierstein

*Attorney, Agent, or Firm*—Edward B. Gregg

[57] ABSTRACT

A system for effecting a sharp separation from tar sands of the large weight fraction of coarse materials present therein and for recovering bitumen, or tar, from the remaining product, wherein, as a first step, finely divided particles of a tar sand are added to a liquid hydrocarbon solvent in an agitation zone to form a dilute solution of the bitumen component which is agitated to maintain both the coarse as well as the fine solid particles present in a well dispersed condition. This dispersion flows downwardly from the agitation zone and through a shallow conduit, generally rectangular in cross section and having an opening extending across its bottom portion over which the dispersion passes. During the short residence time of the dispersion over the opening, the coarse sand particles, which under the influence of gravity fall faster than the fines, selectively drop out of the dispersion and pass through the conduit opening into an underlying sand-receiving chamber. The latter is continuously provided with solvent which wells up into the bitumen solution passing overhead which still contains the fines portion of the dispersion.

7 Claims, 3 Drawing Figures

Figure 1:
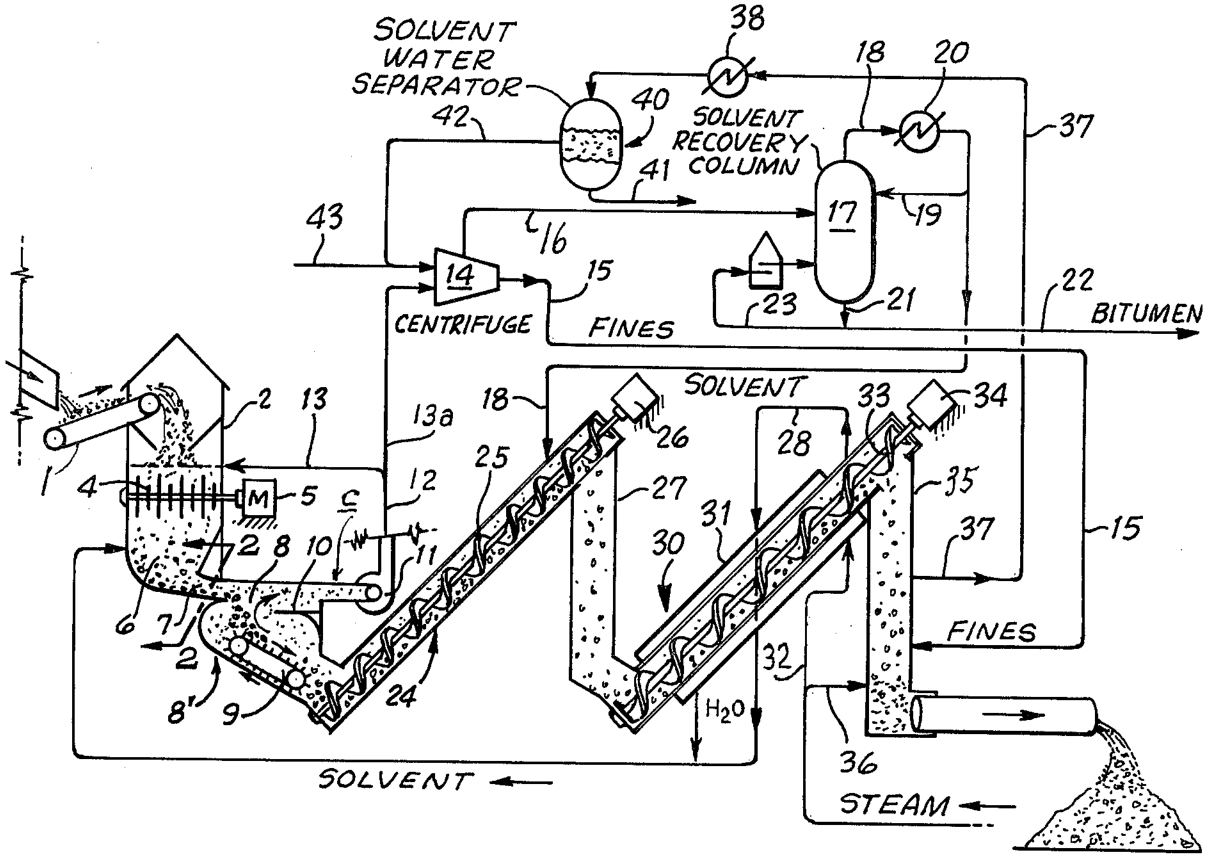

PROCESS AND APPARATUS FOR SEPARATING COARSE SAND PARTICLES AND RECOVERING BITUMEN FROM TAR SANDS

BACKGROUND OF THE INVENTION

The present invention relates to the processing of oil-containing solids such as tar sands to recover hydrocarbons therefrom. More particularly, it relates to a process wherein the oil sands are comminuted and then admixed with a liquid hydrocarbon solvent which is capable of dissolving the tar component of the sands, hereinafter called bitumen. Thereafter the solvent-containing system is processed to remove the coarser sand particles and then to recover a bitumen product stream along with one or more solvent streams which are recycled through the system to effect good recovery of the bitumen from the separated sand components. A process of this character is self-contained and thus differs from those wherein separation of the bitumen is effected by the use of hot water. Thus, in the present method the solvent employed can be obtained from the bitumen at the plant site as the bitumen is distilled or is subjected to processing operations such as cracking, vis breaking, coking or the like which give rise to solvent fractions. The "solvent" so obtained is usually highly aromatic and may comprise a mixture of various liquid hydrocarbon compounds such as benzene and toluene, for example. In contrast, when working with a hot water extraction system, water must be obtained at the plant site in large volumes, which frequently is difficult and expensive. Disposal of the oil- and salt-contaminated water streams recovered from the process is even more difficult. Typical of the tar sands which can be employed in a practice of this invention are the Athabasca tar sands of Canada, the Edna tar sands of California or the Green River tar sands of Utah. Sands of this character typically have an oil (bitumen) content of 8 to 15%, with solids and $H_2O$ making up the remainder. Typically the coarser sand particles which are removed by the present invention constitute from about 75 to 85% of the tar sand, while the fine sand and clay particles which are present constitute only about 2 to 5%. Thus, when a process such as this is employed which essentially removes the coarser sand particles at an extremely low cost, the remainder (fines) can be removed by centrifuging or other conventional means at a low cost made possible by the small amount of the said materials which remain in the bitumen-containing stream to be worked up.

Also contributing to the economy of the present invention is the fact that the coarse sand particles removed, which carry with them appreciable amounts of bitumen, can be efficiently washed and transported with the solvent material employed in the system. Thus, washing and sand-transporting steps become much more difficult and expensive when coarse sand material is admixed with fines, as represented by fine sand particles, clay and the like.

DESCRIPTION OF THE PRIOR ART

The following U.S. patents are believed to represent the prior art which is closest to the present invention.

U.S. Pat. No. 3,553,099, to Savage et al. (1971) discloses a process for recovering tar from tar sand in which the divided tar sand material is admixed with a solvent and passed to an extraction vessel having a mobile bed of tar sand maintained by a rising solvent stream. The arrangement is such that the bitumen-solvent stream removed from the extraction vessel is substantially free of particles. Fines in the extraction vessel (including those returned from working up the bitumen-solvent stream) are recycled to the tar-sand-solvent mixer and eventually are passed, along with all the coarse sand particles, to an elutriation zone supplied with a stream of water which maintains a mobile bed therein. The water carries out displaced hydrocarbons and fines, the latter being returned to the elutriation zone for eventual discharge along with the coarse sand particles. Thus, in contrast to the process of the present invention, where the coarse sand particles are solvent-washed and transported out of contact with the fines, the method of this Savage et al. patent conducts steps in the presence of both fines and the coarser materials. Further, it uses water as an essential processing aid, which is also a disadvantage in many environments.

U.S. Pat. No. 2,973,312, to Logan (1961) shows extraction of oil sands with solvent in a vertical column subjected to sonic vibration. Sand, both coarse and fine collects in the bottom of the column and is transported diagonally upward (with an auger) as it is washed free of oil with clean solvent moving down the auger-containing, sand-transport section. This reference does not teach any process wherein only the coarser sand particles are removed and solvent washed, etc. U.S. Pat. No. 3,161,581, to Tiedje et al., (1964) discloses a method in which the tar sands are admixed with a solvent, with the whole mixture then being centrifuged, washing of the separating sand being effected as still more solvent is introduced into the centrifuge. This patent does not teach an initial, selective removal of the coarse sand fraction, together with the washing of the removed sand as it is separately transported.

SUMMARY OF THE INVENTION

This invention involves a process for recovering bitumen from tar sands by a novel solvent extraction method in which a well comminuted tar sand is first admixed with a liquid hydrocarbon solvent to form a dilute bitumen solution in which, by means of suitable agitation, the coarse as well as the fine solid particles present are well dispersed. This dispersion flows downwardly from the agitation zone and through a shallow conduit, generally rectangular in cross section and having an opening extending across its bottom portion over which the dispersion passes. During the short residence time of the dispersion over the opening, the coarse sand particles, which under the influence of gravity fall faster than the fines, selectively drop out of the dispersion and pass through the conduit opening into an underlying sand-receiving chamber. The latter is continuously provided with solvent which wells up into the bitumen solution passing overhead, which still contains the fines portion of the dispersion, and thus supports the solution. The coarse sand particles separated out in this fashion are collected, solvent-washed and freed of solvent. The residual bitumen solution, containing bitumen, solvent and fines, is in part recycled to the tar sand receiving zone, while the balance is conventionally processed (preferably by centrifuging) to separate out all or most of the fines before being sent to a solvent recovery column where the solvent is stripped from the bitumen. The recovered solvent can be employed to wash the bitumen from the collected coarse sand particles. The bitumen product fraction recovered can be worked up in any desired manner.

Figure 2:
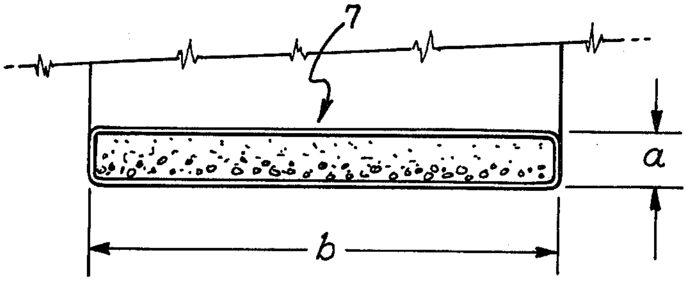
Figure 3:
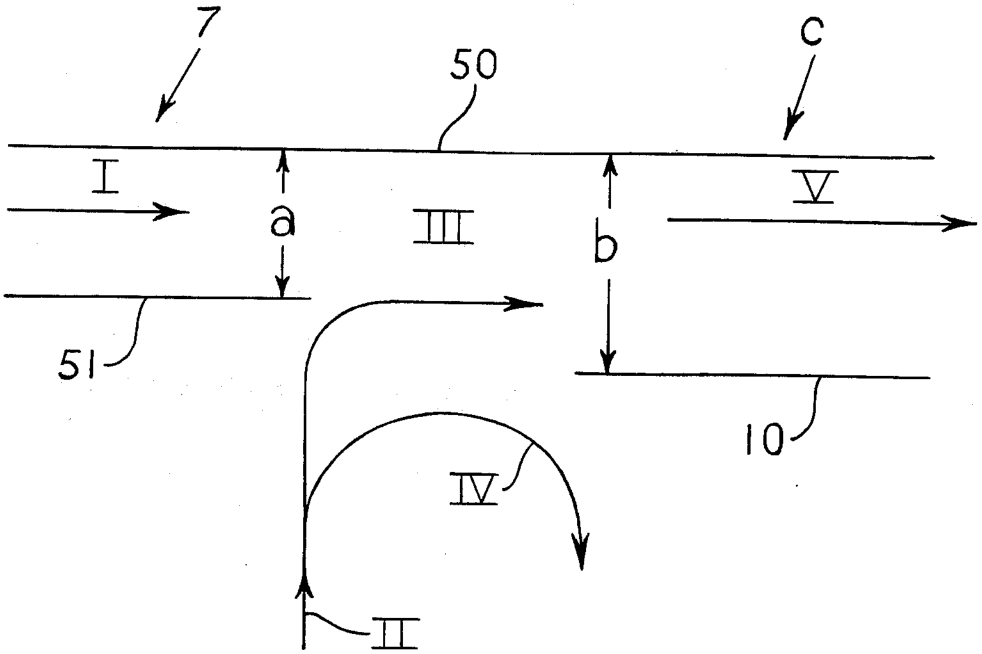

The nature of the gravity separation step for separating out the coarse sand particles and of the apparatus employed therein, will be clearly evident from a consideration of the accompanying drawings, wherein FIG. 1 is a diagrammatic illustration in which equipment is shown in elevation of a suitable arrangement of apparatus for carrying out the invention;

FIG. 2 is a view in section taken along the line 2 — 2 of FIG. 1, to an enlarged scale; and FIG. 3 is a fragmentary view of the conduit-dropout portion of the apparatus of FIG. 1 shown on a larger scale than that of FIG. 1.

Referring now more specifically to the drawings, mined tar sands are continuously introduced through conduit 1 into a fully enclosed, bitumen extraction vessel 2 wherein the introduced sands, comminuted to break up the larger lumps of sand, fall into and are taken up by the dilute bitumen solution continuously provided vessel 2 by recycle stream 13, said solution acting to dissolve the bitumen component of the added tar sand. The sand-containing bitumen solution so formed passes downwardly over the rotating mixer blades 4, driven by motor 5, which act to further the bitumen dissolving action and to effect a uniform dispersion of the large and small sand particles in the bitumen solution, as indicated at 6. In the embodiment of the invention illustrated in the drawings, a quantity of fresh solvent, as recovered by evaporation from the solvent washed coarse sand particles, is continously supplied through line 28 to the liquid present in vessel 2. Dispersion 6 continuously passes into an inlet nozzle 7 of a conduit indicated at C, having the same cross section as the nozzle with a height such as 2 to 5 inches and a width, typically 8 to 10 feet, which preferably matches the width of vessel 2 and its lower throat portion leading into the nozzle. The assemblage shapes the dispersion passing therethrough into a relatively shallow stream. This stream, on entering conduit C, passes through a section indicated at 8 having no bottom. This section, which typically runs for 6 to 8 feet, constitutes the sand dropout section through which fall the larger, i.e., coarser, sand particles which were present in slurry 6. These particles typically make up about 75 to 85% by weight of the tar sand feed. In many cases, the dropout of these larger particles will have begun in vessel 2 as the downwardly flowing stream therein nears nozzle 7. Thus, many of said particles are ready to fall immediately into sand-receiving chamber 8'. The mixture stream entering nozzle 7 has a considerable momentum which acts to carry the stream through the bottomless section and into that indicated at 10 wherein the conduit is shown as assuming a somewhat greater depth than that at nozzle 7 in order to accommodate the solvent which is continuously welling up from chamber 8' to join the solution in conduit C passing over bottom 10. As indicated in the drawings, chamber 8' underlies and is open to the fines-containing stream passing through the floorless portion of conduit C. This arrangement assists in preserving the integrity of the fines-containing stream passing overhead, particularly when the shape of 8' is so contoured as to provide a smooth flow along the interface between the solution in C and the solvent being incorporated in that stream.

The coarse sand particles falling into chamber 8' (the fines do not enter this chamber) are given a first washing to remove bitumen carried thereon as they fall through the solvent present in said chamber. A continuously traveling rake 9 carries these sand particles into a position where they can be picked up and elevated by the inclined screw flight 24 in which they receive a second solvent washing by solvent continuously supplied via line 18. This solvent constitutes the supply to chamber 8'.

The bitumen solution from C is pumped by pump 11 through line 12 and thence to lines 13 and 13*a*. A portion of the solution flows to a centrifuge 14, the balance of the solution being fed back to vessel 2 via line 13, as noted above. Centrigure 14 serves to remove the fines present in the bitumen solution. At this point it is appropriate to note that other equivalent fines removing means such as settling tanks, or the like, could be employed either in lieu of, or along with, the centrifuge. However, use of a centrifuge is preferred and is highly economic since the overall quantity of fines present in tar sands is relatively small. Economics no longer favor centrifuging if an appreciable content of coarse sand reaches the centrifuge. The bitumen solution from centrifuge 14 passes via line 16 to solvent recovery column 17 which is so heated as to distill the solvent overhead through line 18, where it is condensed by passage through a heat exchanger 20 before being introduced, as sand-washing fluid, into the inclined screw flight 24 provided with a screw element 25 driven by motor 26. A portion of the solvent in line 18 is returned through line 19 to the column as reflux. The desired bitumen product is taken as bottoms from column 17 via lines 21 and 22, while a portion of the bitumen from the column is returned via line 23 as recycle to the column after being heated. The solvent washed sand in screw flight 24 falls through conduit 27 to be taken up by a second screw flight 30 for solvent vaporization, said flight having a screw element 33 which is driven by a motor 34. Vaporization of the solvent present on the sand introduced to this unit is effected by the outer steam jacket 31 to which steam is supplied through line 32. The hot recovered solvent vapors are taken back to the vessel 2 through line 28 where they serve in part to keep the liquid contents of said vessel at the desired elevated temperatures, typically 48°–50° C., which favor reduced viscosity in the bitumen solution passing to conduit C. The dried solvent-free sand falls from screw flight 30 through a conduit 35 into which solvent-containing fines are introduced via line 15 as recovered from the centrifuge 14. To recover this portion of the solvent, steam is introduced into column 35, below the zone of fines entry, via line 36. A vapor-containing steam exhaust stream is taken via line 37 to a condenser 38, where the steam and solvent are condensed, and thence to a solvent-water separator 40. Water is drawn off therefrom in line 41, while a solvent stream is recovered and taken through line 42 back to the centrifuge unit 14, along with any other solvent necessary, as provided through line 43. It will be seen that solvent losses in the system are very low. In fact, the process may generate an excess of solvent as the same is stripped from the bitumen in column 17. While the process may operate with a relatively pure aromatic stream such as benzene or toluene, for example, it can also be operated to good economic advantage using a mixture of organic solvents as recovered from the recovered bitumen fraction by distillation, coking, or other type of cracking.

In carrying out the present invention, it is of great importance that essentially all of the coarser sand particles be induced to drop out of the bitumen solution during the period (typically 1 to 3 seconds) in which the solution is passing over the opening in conduit C and is in contact with the solvent system in chamber 8'. The system permits of several adjustments which enhance the dropping out of these particles which, as a class, range from about 50 to 150 microns in diameter. The fines predominantly measure less than about 37 microns. In accordance with Stokes Law, the downward velocity of the particles in the bitumen solution is proportional to the density difference between the particles and the fluid (the bitumen solution); the viscosity of the fluid; and the size and shape of the particles. In the case of generally spherical particles of uniform density, the downward velocity is thus proportional to the particle diameter and the fluid viscosity. The sharpness of the separation is thus due to the fact that those particles which remain dispersed in the bitumen solution passing through nozzle 7 start to drop from essentially the same elevation and are acted upon by gravity for the same duration of time before reaching the bottomed portion 10 of conduit C.

In order to reduce the fluid viscosity to the lowest practical level, and thus speed up the downward velocity of the particles present in the fluid, the solvent content thereof is increased to the maximum practical level, e.g., at least 4 parts by weight of solvent to 1 part of bitumen (4:1). A 6:1 solvent/bitumen level has been found to be a preferred one. Further, to still further reduce the fluid viscosity, the process is operated at elevated temperatures such, for example, as 45° to 60° C., if desired.

Another way to enhance a sharp separation between coarse and fine particles, and to further an essentially complete drop out of all the coarser particles is to reduce the thickness (i.e., the vertical dimension) of the stream of bitumen solution passing through conduit C over the opened bottom section 8. In some cases streams of 1 to 3 inches may be optimum, while in other cases the results obtained in test operations may demonstrate that good results can be had with stream thicknesses of a foot or more. Lastly, by smoothly contouring the bottom portions of vessel 2 to permit of smooth flow of the fluid portion 6, thus inducing a certain amount of dropout on the part of the larger sand particles while still in vessel 2, and/or by sizing the width of the nozzle 7 to be approximately the same as the width of vessel 2, again making for smooth flow of the fluid into conduit C. Many of the coarser sand particles dropping into vessel 8' are at the point of leaving the stream as soon as nozzle 7 is reached.

Referring now to FIG. 3, in which the nozzle 7 and conduit C are shown on a larger scale than in FIG. 1, wall 50 defines the upper limit of nozzle 7 and of conduit C and is horizontal, wall 51 defines the lower limit of nozzle 7 and is horizontal and wall 10, which is longitudinally spaced from wall 51, defines the lower limit of conduit C and is horizontal. As will be seen, the height of nozzle 7 is "*a*" and the greater height of conduit C is "*b*". As the suspension or slurry of solvent and sand passes over the open space between walls 51 and 10, the fine as well as the coarse particles of sand will commence settling but, as explained above, the fine particles will settle more slowly. The difference between "*a*" and "*b*", i.e., the vertical distance between the wall 51 and the wall 10, is such that by the time the stream reaches conduit C the coarser particles will have dropped below the level of wall 10 and will therefore settle into chamber 8', while the fine particles will not have dropped to such level and will be carried into conduit C, thence to pump 11 and centrifuge 14. This method of separation lends itself to in process adjustment. That is to say, the wall 10 may be mounted by well-known means, which require no description herein, so that its level, hence the drop from wall 51 to wall 10 can be adjusted even while the process is in operation, thereby making it possible to effect an optimum separation of coarse and fine particles. Further, the wall 10 may be extensible and retractable so as to provide easy adjustment of the open space between walls 51 and 10. This separation is also aided by the smooth construction, the contour and the dimensioning mentioned hereinabove in the description of FIG. 1, and it is also aided by a feature shown in FIG. 3, which will now be described. Arrow I indicates the rate of flow of slurry or suspension through nozzle 7, arrow II indicates the rate of flow of solvent welling up from chamber 8', arrow III indicates the rate of flow of solvent which is diverted from flow II into conduit C, and arrow IV indicates the solvent which is recirculated to chamber 8', and arrow V indicates the rate of flow in conduit C, which is the sum of I + III. By proportioning the flow rates and by having flow III enter tangentially, i.e., substantially parallel to flow I, turbulence is minimized in the critical open area between walls 51 and 10. Such turbulence will, of course, tend to lift coarse particles which would otherwise sink into vessel 8' and cause them to enter conduit C, and it will also tend to bring down fine particles which otherwise would flow into conduit C and cause them to descend into vessel 8', thereby interfering with a clean separation of coarse and fine material.

What is claimed is:

1. In the solvent extraction of bitumen from sand wherein a tar sand is extracted with a solvent, said sand comprising a mixture of coarse and fine particles, and wherein after extraction the sand is separated from the resulting bitumen solution, the improvement which comprises:

(a) providing a slurry of sand and bitumen solution resulting from admixture of tar sand with a tar solvent;

(b) passing such slurry in a generally horizontal stream through a first conduit having a generally horizontal bottom wall, then over an open space overlying and communicating with an underlying body of solvent, then into a second conduit having a generally horizontal bottom wall which is located at a lower level than the bottom wall of said first conduit, the relative rate of passage of the slurry over said open space being such as to cause coarse particles of sand to settle through said open space into said underlying body of solvent and to cause fine particles to continue with the stream into said second conduit rather than settling out with the coarse sand particles.

2. The improvement of claim 1 wherein a circulation of solvent is maintained in said underlying body of solvent such that a portion of the circulating solvent flows concurrently with said horizontal stream and meets the latter stream substantially tangentially and parallel so as to minimize turbulence at the interface of the two streams, and the combined streams pass into said second conduit, another portion of said circulating solvent being recirculated to said underlying body of solvent.

3. Apparatus for removing the coarser sand particles from a dispersion of tar sands in a liquid hydrocarbon solvent, said apparatus comprising an enclosed vessel adapted to continuously receive comminuted tar sand and a liquid solvent for the bitumen present in said sand;

agitation means positioned in said vessel and adapted to disperse the added sand particles and to effect dissolution of the added bitumen component; a horizontal conduit connected to the bottom of said vessel and adapted to continuously receive the sand-containing dispersion being discharged therefrom, and to carry it to a pump, said conduit having a bottomless section providing an aperture through which, under the influence of gravity, only the coarser sand particles fall; a solvent-containing, coarse sand-receiving chamber positioned beneath said aperture and in communication therewith from which solvent continuously wells up through the conduit aperture to join the dispersion passing overhead, and into which the coarser sand particles fall as they drop through the conduit aperture; and means for continuously supplying solvent to said chamber at a rate which corresponds to that at which solvent from the chamber joins the dispersion passing overhead.

4. The apparatus of claim 3 wherein the conduit is of substantially the same width as the enclosed vessel which serves to receive the tar sand and the solvent for the added bitumen component.

5. Apparatus for separating coarse sand particles from fine sand particles in a mixture of sand and dissolved bitumen resulting from extraction of tar sand with a tar solvent, said apparatus comprising:

(a) a vessel for holding a body of such mixture, (b) a first generally horizontal conduit open at one end to said vessel and also open at its other end, and having a bottom wall, (c) a second generally horizontal conduit having a bottom wall which is at a lower level than, and is longitudinally spaced from, the bottom wall of said first conduit, (d) said conduits being arranged for horizontal flow from the outlet of the first conduit, across the open space between the bottom walls and through the second conduit, and (e) a chamber located beneath said conduits, which is in communication with said open space, for holding a body of tar solvent, (f) the difference in level of said bottom walls, and the spacing thereof, being such that coarser particles of sand will drop through the open space and into said chamber from a stream of said mixture flowing from said first conduit into said second conduit, and finer particles will pass along with said stream across said open space and into said second conduit.

6. A process for recovering bitumen from tar sands which comprises admixing tar sand particles with a liquid hydrocarbon solvent to form a dilute solution of the bitumen component of the tar sand in the solvent, in which solution the coarse sand particles as well as the fine particles present in the tar sand are initially dispersed; causing this resulting particle-containing bitumen solution to flow through a shallow conduit having an opening extending across a section of its bottom over which the said solution passes at a rate such that the residence time of the solution over the opening selectively permits the fines to pass over the said opening and the coarse sand particles to drop out and pass through the conduit opening into an underlying sand-receiving chamber provided with the aforesaid solvent which continuously wells up into and supports the bitumen solution as the same is passing overhead across the conduit opening; separating the fine particles from the solution discharged from the conduit; and separating the resulting solution into its respective bitumen and solvent components.

7. The process of claim 6 in which the solution discharged from the conduit is in part recycled for admixture with the incoming tar sand particles; wherein the coarse sand particles falling into the sand-receiving chamber are transported therefrom to a sand-washing section; and wherein solvent recovered upon separating out the bitumen is first utilized to wash the sand in the sand-washing section and is then supplied as a solvent stream to the said sand-receiving chamber.

* * * * *